United States Patent
Kanai et al.

(10) Patent No.: US 7,421,188 B2
(45) Date of Patent: Sep. 2, 2008

(54) INFORMATION EDITION DEVICE, INFORMATION EDITION METHOD, INFORMATION EDITION PROGRAM, AND INFORMATION RECORDING MEDIUM

(75) Inventors: Yuichi Kanai, Moriguchi (JP); Yoshihiro Hori, Moriguchi (JP); Ryoji Ohno, Osaka (JP); Takeo Ohishi, Yokohama (JP); Kenichiro Tada, Tokorozawa (JP); Akihiro Tozaki, Tokorozawa (JP); Tatsuya Hirai, Kawasaki (JP)

(73) Assignees: Sanyo Electric Co., Ltd., Moriguchi-shi, Osaka (JP); Sharp Corporation, Osaka-shi, Osaka (JP); Victor Company of Japan, Limited, Yokohama-shi, Kanagawa (JP); Pioneer Corporation, Tokyo (JP); Hitachi, Ltd., Tokyo (JP)

( * ) Notice: Subject to any disclaimer, the term of this patent is extended or adjusted under 35 U.S.C. 154(b) by 816 days.

(21) Appl. No.: 10/506,515

(22) PCT Filed: Mar. 4, 2003

(86) PCT No.: PCT/JP03/02509

§ 371 (c)(1),
(2), (4) Date: Sep. 3, 2004

(87) PCT Pub. No.: WO03/075276

PCT Pub. Date: Sep. 12, 2003

(65) Prior Publication Data

US 2005/0152672 A1    Jul. 14, 2005

(30) Foreign Application Priority Data

Mar. 5, 2002   (JP) ............................. 2002-107158

(51) Int. Cl.
*H04N 5/93* (2006.01)
*H04N 5/91* (2006.01)

(52) U.S. Cl. ......................................... 386/52; 386/94
(58) Field of Classification Search .................. 386/52, 386/46, 94, 55, 125, 45
See application file for complete search history.

(56) References Cited

U.S. PATENT DOCUMENTS

| | | | |
|---|---|---|---|
| 6,408,301 B1 * | 6/2002 | Patton et al. ................. | 707/102 |
| 6,738,092 B1 * | 5/2004 | Nakagawa et al. ....... | 348/231.3 |
| 2007/0154013 A1 * | 7/2007 | Kato et al. ................... | 380/200 |

FOREIGN PATENT DOCUMENTS

| | | |
|---|---|---|
| JP | 09-093527 | 4/1997 |
| JP | 11-284948 | 10/1999 |

(Continued)

*Primary Examiner*—Robert Chevalier
(74) *Attorney, Agent, or Firm*—Drinker Biddle & Reath LLP

(57) ABSTRACT

An information editing apparatus is provided which can prevent a thumbnail image, which shows the contents of recorded information recorded on an information recording medium, from being accidentally changed by a misoperation of the user.

The information editing apparatus includes a deciding device 8 for deciding whether a thumbnail image can be changed or not based on change permission information, which indicates whether a change can be made on the thumbnail image showing the contents of recorded information recorded on a recording medium 1. When the deciding device 8 decides that a change is not permitted, a change of the thumbnail image is prohibited.

9 Claims, 14 Drawing Sheets

FOREIGN PATENT DOCUMENTS

| | | |
|---|---|---|
| JP | 2000-353375 | 12/2000 |
| JP | 2001-169231 | 6/2001 |
| JP | 2002-033986 | 1/2002 |
| JP | 2002-352566 | 12/2002 |
| KR | 1999-0081730 | 11/1999 |
| KR | 2000-0000568 | 1/2000 |

\* cited by examiner

INFORMATION EDITION DEVICE, INFORMATION EDITION METHOD, INFORMATION EDITION PROGRAM, AND INFORMATION RECORDING MEDIUM

TECHNICAL FIELD

The present invention relates to a technical field of an information editing apparatus, an information editing method, an information editing program, and an information recording medium, and specifically relates to an information editing apparatus for editing a reproduced form of recorded information, which includes at least image information and is recorded on a recording medium, an information editing method, an information editing program, and an information recording medium.

BACKGROUND ART

A conventional information editing apparatus is disclosed in Japanese Patent Laid-Open No. 2000-353375. The information editing apparatus is used to edit a reproduced form of recorded information which includes one or more images and is recorded on an optical disk. In the apparatus, a part of the recorded information that includes one or more images is selected from the recorded information, the timing of the reproduction of the selected part is specified, the image included in the part is extracted as a representative image of the part, and the specified timing of reproduction and the extracted representative image are recorded on the optical disk as a play list separately from the recorded information.

That is, in the format of the conventional information editing apparatus, information indicating the reproduction position of recorded information is recorded on the optical disk serving as a recording medium and a thumbnail image is generated from the recorded information, the thumbnail image showing what is in the recorded information (hereinafter also referred to as contents) on the optical disk.

In the method in which a thumbnail image of the contents recorded on the optical disk is specified in the conventional information editing apparatus, it is possible to reset the thumbnail image, whereas there is no device indicating the prohibition of resetting. Therefore, in the conventional information editing apparatus, a thumbnail image set by the user and a contents holder may be accidentally changed by a misoperation of the user.

The present invention is devised in view of the circumstances. An object of the present invention is to provide an information editing apparatus capable of preventing an accidental change of a thumbnail image which shows the contents of recorded information, an information editing method, an information editing program, and an information recording medium.

DISCLOSURE OF INVENTION

In order to solve problem, the invention of claim 1 is an information editing apparatus for editing a reproduced form of recorded information which includes at least image information and is recorded on a recording medium, comprising a deciding device for deciding whether a thumbnail image can be changed or not based on change permission information indicating whether the thumbnail image is changeable, the thumbnail image showing contents of the recorded information recorded on the recording medium, wherein when the deciding device decides that a change is not permitted, a change of the thumbnail image is prohibited.

With this configuration, according to the invention of claim 1, when the deciding device decides that a change is not permitted based on the change permission information indicating whether the thumbnail image can be changed or not, a change of the thumbnail image is prohibited. Thus, it is possible to prevent an accidental change of the thumbnail image which shows the contents of the recorded information. Consequently, it is possible to protect thumbnail images and recorded information set by a contents holder and protect thumbnail images set by the user.

In order to solve the problem, according to the information editing apparatus of claim 1, the invention of claim 2 is characterized by comprising a generating circuit which generates a display signal for displaying a warning indicating that the thumbnail image cannot be changed when the deciding device decides that a change is not permitted.

With this configuration, according to the invention of claim 2, when the deciding device decides that a change is not permitted, a warning is displayed to indicate that the thumbnail image cannot be changed. Thus, it is possible to enable the user to clearly recognize that the thumbnail image cannot be changed.

In order to solve the problem, according to the information editing apparatus of claim 1, the invention of claim 3 is characterized by comprising a changing device for changing the thumbnail image when the deciding device decides that a change is permitted.

With this configuration, according to the invention of claim 3, when the deciding device decides that a change is permitted, the thumbnail image is changed. Thus, the user can select whether a thumbnail image should be protected or not, thereby facilitating the setting of the thumbnail image for the user.

In order to solve the problem, the invention of claim 4 is an information editing method for editing a reproduced form of recorded information which includes at least image information and is recorded on a recording medium, comprising a deciding process for deciding whether a thumbnail image can be changed or not based on change permission information indicating whether a change can be made on the thumbnail image showing the contents of the recorded information recorded on the recording medium, wherein when the deciding process decides that a change is not permitted, a change of the thumbnail image is prohibited.

With this configuration, according to the invention of claim 4, when the deciding process decides that a change is not permitted based on the change permission information indicating whether the thumbnail image can be changed or not, a change of the thumbnail image is prohibited. Thus, it is possible to prevent an accidental change of the thumbnail image which shows the contents of the recorded information. Consequently, it is possible to protect thumbnail images and recorded information set by a contents holder and protect thumbnail images set by the user.

In order to solve the problem, according to the information editing method of claim 4, the invention of claim 5 is characterized by comprising a generating process which generates a display signal for displaying a warning indicating that the thumbnail image cannot be changed when the deciding device decides that a change is not permitted.

With this configuration, according to the invention of claim 5, when the deciding process decides that a change is not permitted, a warning is displayed to indicate that a thumbnail image cannot be changed. Thus, it is possible to enable the user to clearly recognize that the thumbnail image cannot be changed.

In order to solve the problem, according to the information editing method of claim 4, the invention of claim 6 is characterized by comprising a changing process for changing the thumbnail image when the deciding device decides that a change is permitted.

With this configuration, according to the invention of claim 6, when the deciding process decides that a change is permitted, the thumbnail image is changed. Thus, the user can select whether a thumbnail image should be protected or not, thereby facilitating the setting of the thumbnail image for the user.

In order to solve the problem, the invention of claim 7 is characterized by causing a computer to act as a deciding device, the computer being included in an information editing apparatus for editing a reproduced form of recorded information which includes at least image information and is recorded on a recording medium, the deciding device deciding whether a thumbnail image can be changed or not based on change permission information indicating whether a change can be made on the thumbnail image showing the contents of the recorded information recorded on the recording medium, wherein the computer serving as the deciding device is caused to prohibit a change of the thumbnail image when the deciding device decides that a change is not permitted.

With this configuration, according to the invention of claim 7, when the deciding device decides that a change is not permitted, a computer operates so as to prohibit a change of the thumbnail image. Thus, it is possible to prevent an accidental change of the thumbnail image which shows the contents of the recorded information. Consequently, it is possible to protect thumbnail images and recorded information set by a contents holder and protect thumbnail images set by the user.

In order to solve the problem, according to the information editing program of claim 7, the invention of claim 8 is characterized by causing the computer to act as a generating device which generates a display signal for displaying a warning indicating that the thumbnail image cannot be changed when the deciding device decides that a change is not permitted.

With this configuration, according to the invention of claim 8, when the deciding device decides that a change is not permitted, the computer operates so as to display a warning indicating that a thumbnail image cannot be changed. Thus, it is possible to enable the user to clearly recognize that the thumbnail image cannot be changed.

In order to solve the problem, according to the information editing program of claim 7, the invention of claim 9 is characterized by causing the computer to act as a changing device for changing the thumbnail image when the deciding device decides that a change is permitted.

With this configuration, according to the invention of claim 9, when the deciding device decides that a change is permitted, the computer operates so as to change a thumbnail image. Thus, the user can select whether a thumbnail image should be protected or not, thereby facilitating the setting of the thumbnail image for the user.

In order to solve the problem, the invention is characterized by recording the information editing program according to any one of claims 7 to 9.

When the information editing program of claim 7 is recorded, the computer is caused to operate so as to prohibit a change of a thumbnail image when the deciding device decides that a change is not permitted. Thus, it is possible to prevent an accidental change of the thumbnail image which shows the contents of the recorded information. Consequently, it is possible to protect thumbnail images and recorded information set by a contents holder and protect thumbnail images set by the user.

In the case where the information editing program of claim 8 is recorded, when the deciding device decides that a change is not permitted, the computer operates so as to display a warning indicating that a thumbnail image cannot be changed. Thus, it is possible to enable the user to clearly recognize that the thumbnail image cannot be changed.

In the case where the information editing program of claim 9 is recorded, when the deciding device decides that a change is permitted, the computer operates so as to change a thumbnail image. Thus, the user can select whether a thumbnail image should be protected or not, thereby facilitating the setting of the thumbnail image for the user.

BEST MODE FOR CARRYING OUT THE INVENTION

Figure 1:
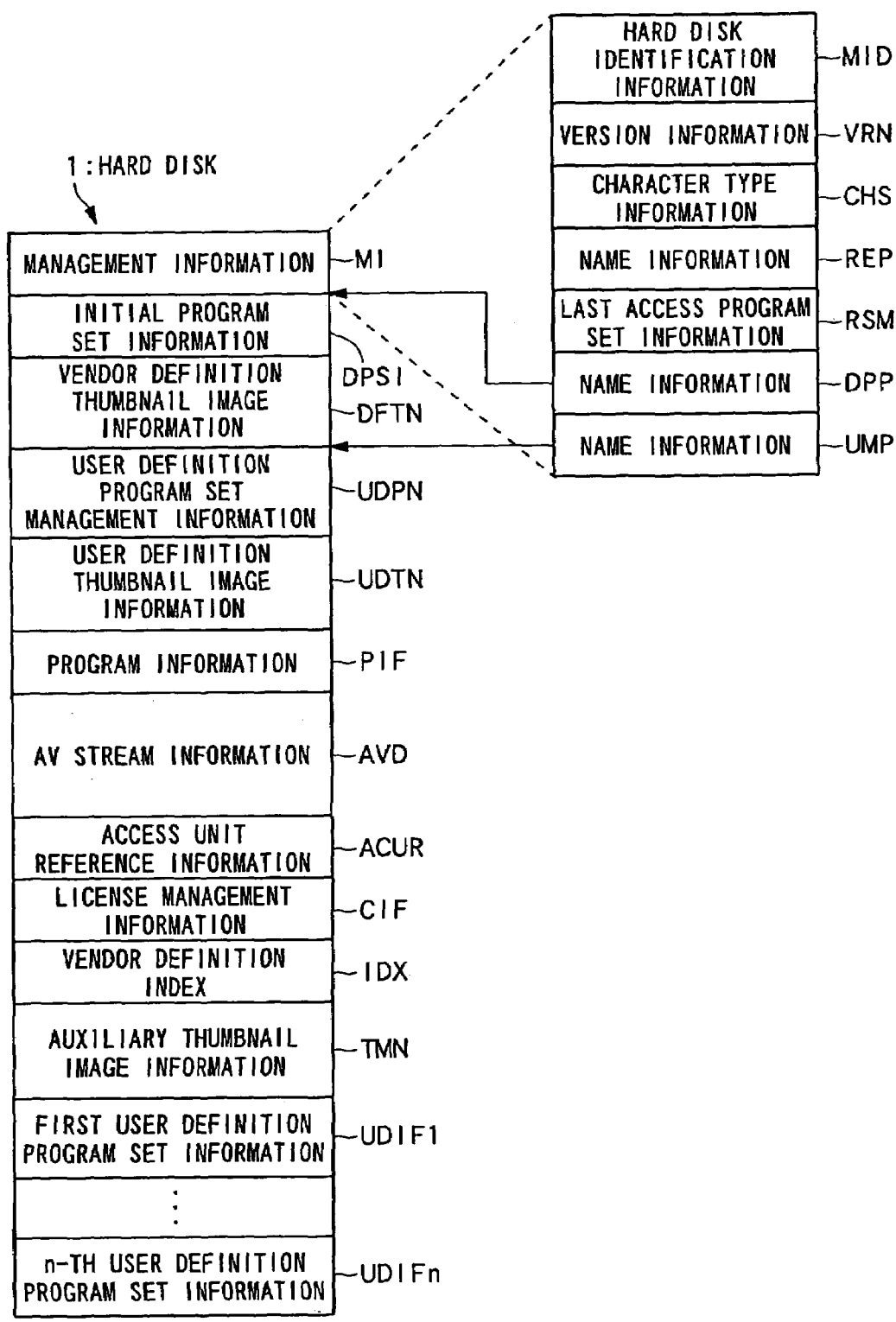
FIG. 1 is an explanatory drawing showing a recording format (I) of an embodiment of an information editing apparatus according to the present invention.

Preferred embodiments of the present invention will be described below in accordance with the accompanying drawings.

In the following embodiments, an information editing apparatus of the present invention is applied to an information recording apparatus which can record, on a portable hard disk, AV (Audio Visual) information (including music information or image information) distributed via a network such as the Internet, and edit the recorded AV information, the hard disk being processed for copyright protection.

In the following explanation, the AV information is distributed according to the transport stream standard of MPEG (Moving Picture Experts Group) 2, which is a known standard of a moving image compression technique.

(I) EMBODIMENT OF A RECORDING FORMAT

First, prior to a specific explanation about the information recording apparatus of the present embodiment, referring to FIGS. 1 to 7, the following will describe the outline of logical recording formats which are used when the information recording apparatus records the AV information on the hard disk. FIGS. 1 to 7 schematically show the recording formats in a hierarchical manner. The AV information has been recorded on the hard disk in the recording format.

The recording formats shown in FIGS. 1 to 7 are logical recording formats used for recording the AV information of the present embodiment on the hard disk. As to the physical recording format used for recording, a known physical format for the hard disk is used as it is.

First, the following will describe the outline of various concepts which are used in the recording formats to efficiently manage the contents and the recording format of the recorded AV information.

First, in the recording formats below, a concept "program" is used as a unit for handling recorded AV information. That is, a program represents one piece of AV information continuously recorded on the hard disk.

When distributed AV information is analog information, for example, when one television program is continuously recorded, the television program acts as a "program." When only a part of the program is continuously recorded, only the continuously recorded part acts as a "program." When a plurality of television programs are continuously recorded at same time, the continuously recorded television programs act as one "program." Meanwhile, when the AV information is digital information, for example, when the AV information is distributed via BS (Broadcast Satellite) digital broadcasting, one event of BS digital broadcasting is defined as a "program."

Second, in the recording formats below, a concept "program list" is used to enable the user (user who watches recorded AV information) to freely edit recorded AV information and logically create a new program. That is, the program list is a set of pieces of instruction information (generally also referred to as pointers) used for specifying one program or a part of the program to make a distinction from other programs or other parts. A representative image (hereinafter referred to as a thumbnail image), which represents the contents of AV information (image information) included in the program list, can be defined for each program list.

Therefore, for example, when the user performs edits so as to successively reproduce a part of one recorded program and a part of another recorded program in this order, the user combines instruction information indicating the part of the one program and instruction information indicating the part of the another program so as to reproduce the instruction information in this order, so that one program list is created. With the concept of the program list, it is possible to reproduce AV information in a reproduced form desired by the user without changing the original recording order and so on of the AV information having been recorded on the hard disk.

The following program lists are defined: a program list set by the user who refers to recorded AV information in the above manner (user definition program list), and a program list set in advance by a provider (vendor) who distributes AV information to be recorded (vendor definition program list).

Further, the following thumbnail images are defined: a vendor definition thumbnail image which is set in advance by the vendor and distributed with AV information, and a user definition thumbnail image which is additionally set by the user after distributed AV information is recorded on the hard disk.

Third, in the recording formats below, a concept "program set" is used as a set including two or more user definition program lists or vendor definition program lists created based on a reproduced form desired by the user (to be specific, the reproducing order specified by the user for each piece of AV information). The following program sets are defined: an initial program set used for reproducing, in the original recording order, AV information (program) first recorded on the hard disk (a program list included in the initial program set is the vendor definition program list), and a user definition program set including the user definition program list.

Fourth, in the recording formats below, a concept "index" is used as a kind of the instruction information. That is, the index is instruction information for specifying one program or a part of the program to make a distinction from other programs or other parts, and the index is provided for enabling the user to facilitate handling of AV information. The following indexes are defined: a vendor definition index which is set in advance by the vendor before distribution, and a user definition index which is additionally set by the user after distributed AV information is recorded on the hard disk. The vendor definition index is distributed as an index file along with AV information, whereas the user definition index is represented as the program list.

The logical recording formats of the present embodiment will be discussed below based on the various concepts.

As shown in FIG. 1, on a hard disk 1 where necessary AV information has been recorded, the following information is recorded: management information MI which is management information on an overall program recorded on the hard disk 1 and is first referred to in the reproduction of recorded AV information, initial program set information DPSI which is management information on the initial program set, vendor definition thumbnail image information DFTN in which image information corresponding to the vendor definition thumbnail image is identified by the name of the image information, user definition program set management information UDPM which is management information on the user definition program set, user definition thumbnail image information UDTN in which image information corresponding to the user definition thumbnail image is identified by the name of the image information, program information PIF which is management information corresponding to the programs, AV stream information AVD which is an entity of AV information distributed and recorded on the hard disk 1, access unit reference information ACU which includes, for each access unit, address information and information indicating a total amount of information of one I picture (Intra-coded Picture) in one access unit, the address information indicating the recording position of the I picture on the hard disk 1 in one access unit, which is constituted of image information corresponding to the I picture included in the AV information, license management information CIF for managing a license status of recorded AV information, the vendor definition index IDX, auxiliary thumbnail image information TMN corresponding to an auxiliary image which is used as a thumbnail image but is neither the vendor definition thumbnail image nor the user definition thumbnail image, and user definition program set information UDIF1 to UDIFn serving as management information on the user definition program sets which are defined after AV information is recorded on the hard disk 1 (FIG. 1 has n sets of user definition program sets).

As shown in FIG. 1, the management information MI is constituted of hard disk identification information MID (12 bytes) for identifying the hard disk 1 from other hard disks, version information VRN (2 bytes) indicating the version of the hard disk 1, character type information CHS (2 bytes) indicating a character type (attribute) included in recorded AV information, name information REP (128 bytes) indicating a name when the hard disk 1 has a name, a last access program set number RSM which is the number of the last program set reproduced at the completion of the reproduction of AV information recorded on the hard disk 1, name information DPP describing a file name of the initial program set information DPSI (i.e., a so-called path name which specifically indicates the name "initial program set information DPSI"), and name information UMP describing a file name of the user program set management information UDPM (similarly referred to as a path name which specifically indicates the name "user definition program set management information UDPM").

Figure 2:
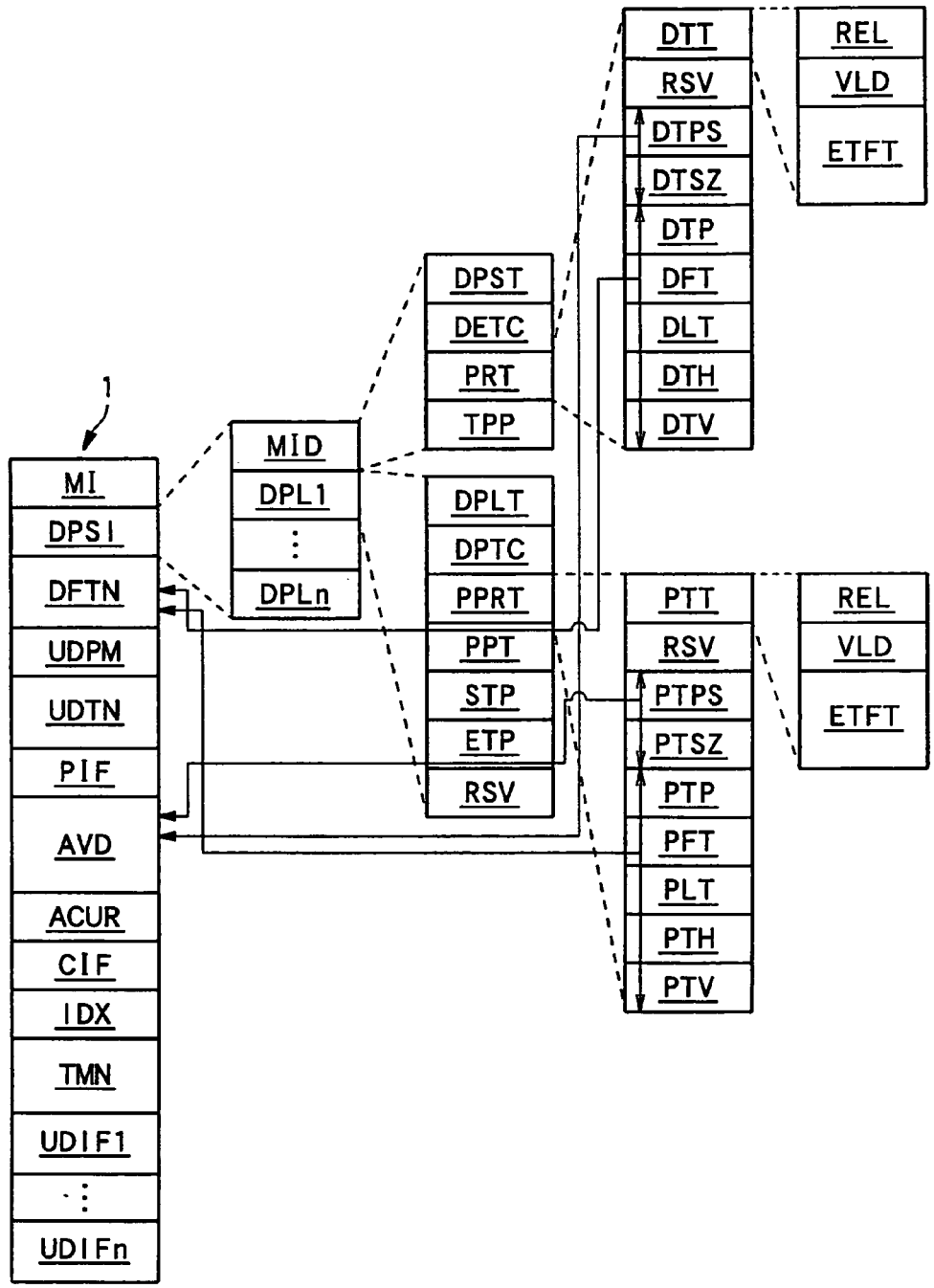
FIG. 2 an explanatory drawing showing a recording format (II) of the present embodiment.

Referring to FIG. 2, the detailed configuration of the initial program set information DPSI will be described below.

As shown in FIG. 2, the initial program set information DPSI includes initial program set general information DPI which includes name information and so on indicating the name of the initial program set and pieces of vendor definition program list information DPL1 to DPLn which concern a plurality of vendor definition program lists included in the initial program set.

The initial program set general information DPI includes name information DPST (80 bytes) indicating the name of the initial program set, other information DETC (148 bytes) indicating other information of the initial program set general information DPI (including memo information indicating the attribute and so on of the initial program set), initial program set representative image information PRT (156 bytes) on image information for a thumbnail image corresponding to the initial program set (also a thumbnail image representing the overall hard disk 1), and name information TPP (128 bytes) which describes the name of image information corresponding to the initial program set representative image only when a thumbnail image specifier effective flag (described later) is effective.

The initial program set representative image information PRT includes attribute information DTT (1 byte) indicating the attribute of the initial program set representative image, auxiliary information RSV (3 bytes) which is insignificant information of the initial program set representative image information PRT, initial program set representative image recording position information DTPS (8 bytes) which describes the recording position (the recording position of the start of information serving as the I picture) of image information corresponding to the initial program set representative image on the hard disk 1 (in this case, only the I picture of recorded AV information corresponds to the image information) only when the thumbnail image specifier effective flag (described later) is effective, initial program set representative image information amount information DTSZ (4 bytes) which describes an amount of image information (the number of bytes) corresponding to the initial program set representative image only when the thumbnail image specifier effective flag (described later) is effective, name information DTP (128 bytes) describing the name of image information corresponding to the initial program set representative image, offset position information DFT (4 bytes) describing the position of image information corresponding to the initial program set representative image in the vendor definition thumbnail image information DFTN (to be specific, the number of offset bytes from the start of the vendor definition thumbnail image information DFTN), initial program set representative image information amount information DLT (4 bytes) describing an amount of image information (the number of bytes) corresponding to the initial program set representative image, horizontal information amount information DTH (2 bytes) which describes an amount of information in the horizontal direction of image information corresponding to the initial program set representative image stored as a file, and vertical information amount information DTV (2 bytes) which describes an amount of information in the vertical direction of image information corresponding to the initial program set representative image stored as a file.

To be specific, the initial program set representative image recording position information DTPS and the initial program set representative image information amount information DTSZ indicate the recording position and an amount of information of any one of static images included in the AV stream information AVD (the static image is used as the initial program set representative image). Meanwhile, the name information DTP, the offset position information DFT, the initial program set representative image information amount information DLT, the horizontal information amount information DTH, and the vertical information amount information DTV indicate static images which are recorded in the vendor definition thumbnail image information DFTN and are identified by name.

The attribute information DTT includes permission information REL serving as change permission information indicating whether the reset of the initial program set representative image should be permitted or not, a thumbnail image specifier effective flag VLD indicating whether the specification of a static image is effective or not, which uses the initial program set representative image recording position information DTPS and the initial program set representative image information amount information DTSZ, and attribute information ETFT indicating the type (attribute) of image information corresponding to an image used as the initial program set representative image when the image is selected from image information other than distributed AV information. In this case, the permission information REL has a value "0" written to it when permitting the reset of the initial program set representative image. When the reset is not permitted, the permission information REL has a value "1" written to it. The thumbnail image specifier effective flag VLD has a value "1" written to it when the specification of a static image is effective, which uses the initial program set representative image recording position information DTPS and the initial program set representative image information amount information DTSZ. When the specification is ineffective, the thumbnail image specifier effective flag VLD has a value "0" written to it.

The vendor definition program list information DPL includes name information DPLT (80 bytes) indicating a name (can be changed by the user) of a vendor definition program list corresponding to the vendor definition program list information DPL, other information DPTC (108 bytes) which is other information (including memo information indicating the attribute and so on of the vendor definition program list) of the vendor definition program list information DPL, vendor definition program list representative image information PPRT (156 bytes) which concerns image information for a thumbnail image corresponding to the vendor definition program list, name information PPT (128 bytes) describing the name of program information (described later) corresponding to a program included in the vendor definition program list, start position information STP (8 bytes) describing the recording start position of a program on the hard disk 1, the program having access according to the vendor definition program list, end position information ETP (8 bytes) describing the recording end position of the program on the hard disk 1, the program having access according to the vendor definition program list, and auxiliary information RSV (4 bytes) which is insignificant information of the vendor definition program list information DPL.

The vendor definition program list representative image information PPRT includes attribute information PTT (1 byte) indicating the attribute of the vendor definition program list representative image, auxiliary information RSV (3 bytes) which is insignificant information of the vendor definition program list representative image information PPRT, vendor definition program list representative image recording position information PTPS (8 bytes) which describes the recording position (the recording position of the start of information serving as the I picture) of the image information corresponding to the vendor definition program list representative image on the hard disk 1 (in this case, only the I picture of recorded AV information corresponds to the image information) only when the thumbnail image specifier effective flag (described later) is effective, vendor definition program list representative image information amount information PTSZ (4 bytes) which describes an amount (the number of bytes) of image information corresponding to the vendor definition program list representative image only when the thumbnail image specifier effective flag (described later) is effective, name information PTP (128 bytes) describing the name of image information corresponding to the vendor definition program list representative image, offset position information PFT (4 bytes) describing the position of image information, which corresponds to the vendor definition program list representative image, in the vendor definition thumbnail image information DFTN (to be specific, the number of offset bytes from the start of the vendor definition thumbnail image information DFTN), vendor definition program list representative image information amount information PLT (4 bytes) describing an amount (the number of bytes) of image information corresponding to the vendor definition program list representative image, horizontal information amount information PTH (2 bytes) which describes an amount of information in the horizontal direction of image information corresponding to the vendor definition program list representative image stored as a file, and vertical information amount information PTV (2 bytes) which describes an amount of information in the vertical direction of image information corresponding to the vendor definition program list representative image stored as a file.

The vendor definition program list representative image recording position information PTPS and the vendor definition program list representative image information amount information PTSZ specifically indicate the recording position and an amount of information of any one of static images included in the AV stream information AVD (the static image is used as the vendor definition program list representative image). Meanwhile, the name information PTP, the offset position information PFT, the vendor definition program list representative image information amount information PLT, the horizontal information amount information PTH, and the vertical information amount information PTV indicate static images which are recorded in the vendor definition thumbnail image information DFTN and are identified by name.

The attribute information PTT includes permission information REL serving as change permission information indicating whether the reset of the vendor definition program list representative image should be permitted or not, the thumbnail image specifier effective flag VLD indicating whether the specification of a static image is effective or not, which uses the vendor definition program list representative image recording position information PTPS and the vendor definition program list representative image information amount information PTSZ, and attribute information ETFT indicating the type (attribute) of image information corresponding to an image used as the vendor definition program list representative image when the image is selected from image information other than distributed AV information. In this case, the permission information REL has a value "0" written to it when permitting the reset of the vendor definition program list representative image. When the reset is not permitted, the permission information REL has a value "1" written to it. The thumbnail image specifier effective flag (hereinafter also referred to as a pointer in contents of a thumbnail specifier) VLD has a value "1" written to it when the specification of a static image is effective, which uses the vendor definition program list representative image recording position information PTPS and the vendor definition program list representative image information amount information PTSZ. When the specification is ineffective, the thumbnail image specifier effective flag VLD has a value "0" written to it.

Figure 3:
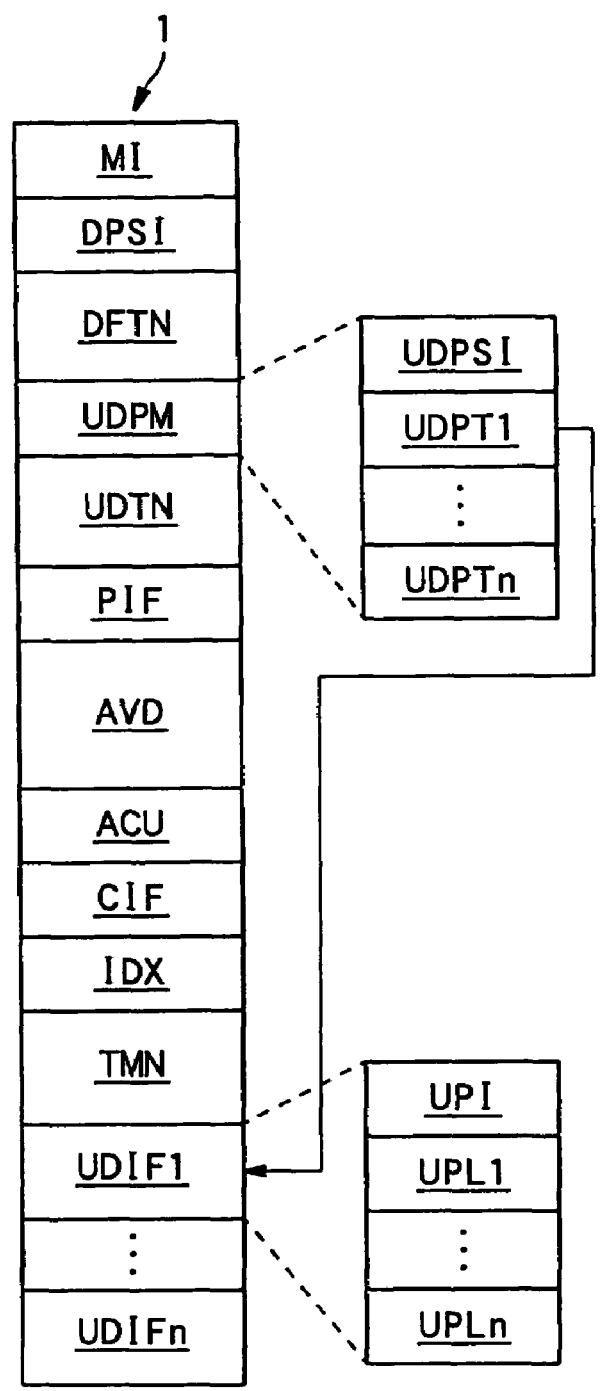
FIG. 3 an explanatory drawing showing a recording format (III) of the present embodiment.

Referring to FIG. 3, the detailed configuration of the user definition program set management information UDPM will be described below.

As shown in FIG. 3, the user definition program set management information UDPM includes user definition program set general information UDPSI which describes total information indicating a total number of the user definition program sets and name information UDPT1 to UDPTn which describe names "user definition program set information UDIF1 to UDIFn" (to be specific, e.g., the name "user definition program set information UDIF1") for each of the user definition program set information UDIF.

As shown in FIG. 3, the user definition program set information UDIF having a name indicated by the name information UDPT includes user definition program set general information UPI which includes name information and so on indicating the name of the user definition program set, and pieces of user definition program list information UPL1 to UPLn which concern a plurality of user definition program lists included in the user definition program set. The user definition program set general information UPI has a same hierarchical structure as the initial program set general information DPI shown in FIG. 2. The user definition program list information UPL also has the same hierarchical structure as the vendor definition program list information DPL shown in FIG. 2.

Figure 4:
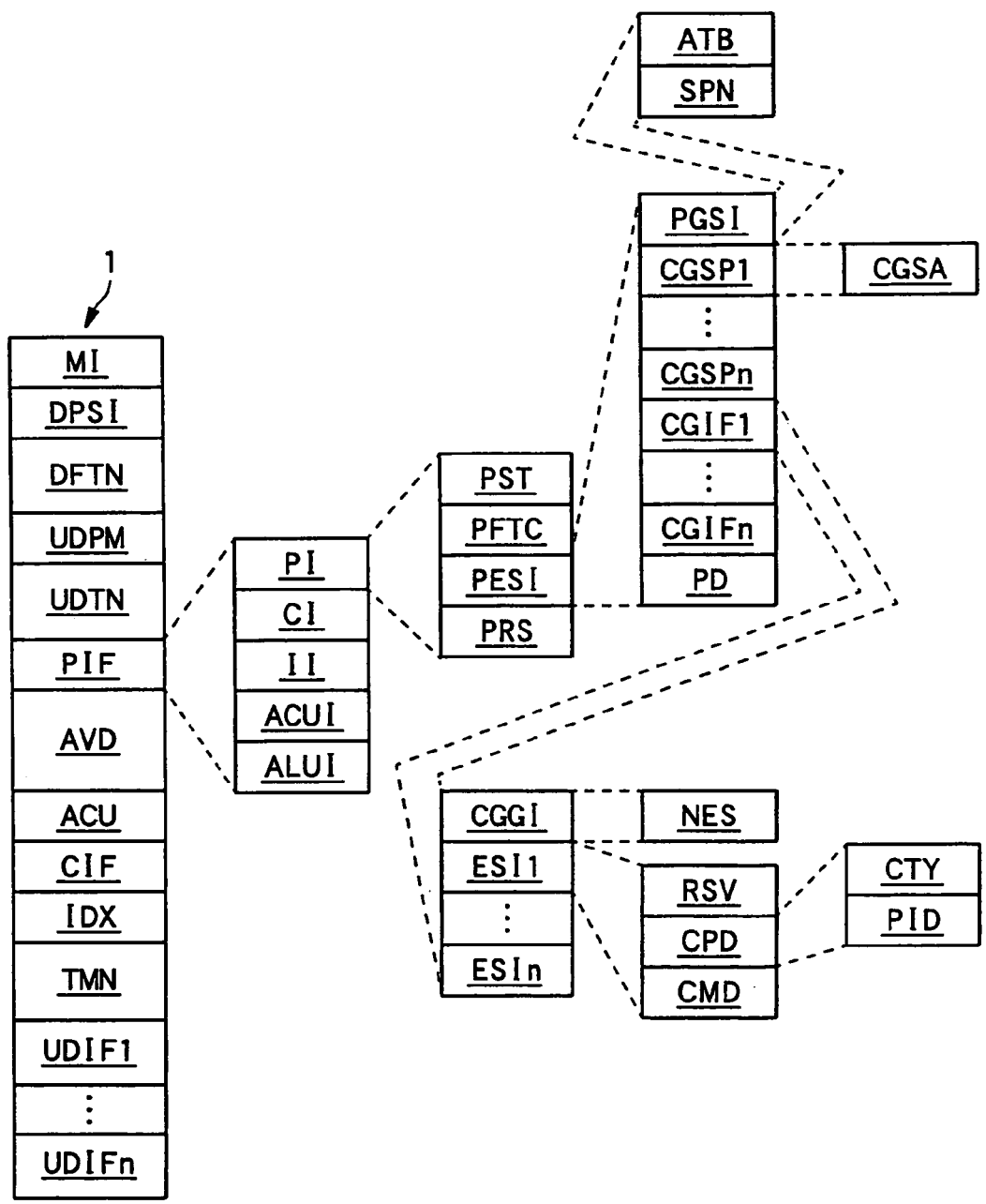
FIG. 4 an explanatory drawing showing a recording format (IV) of the present embodiment.
Figure 5:
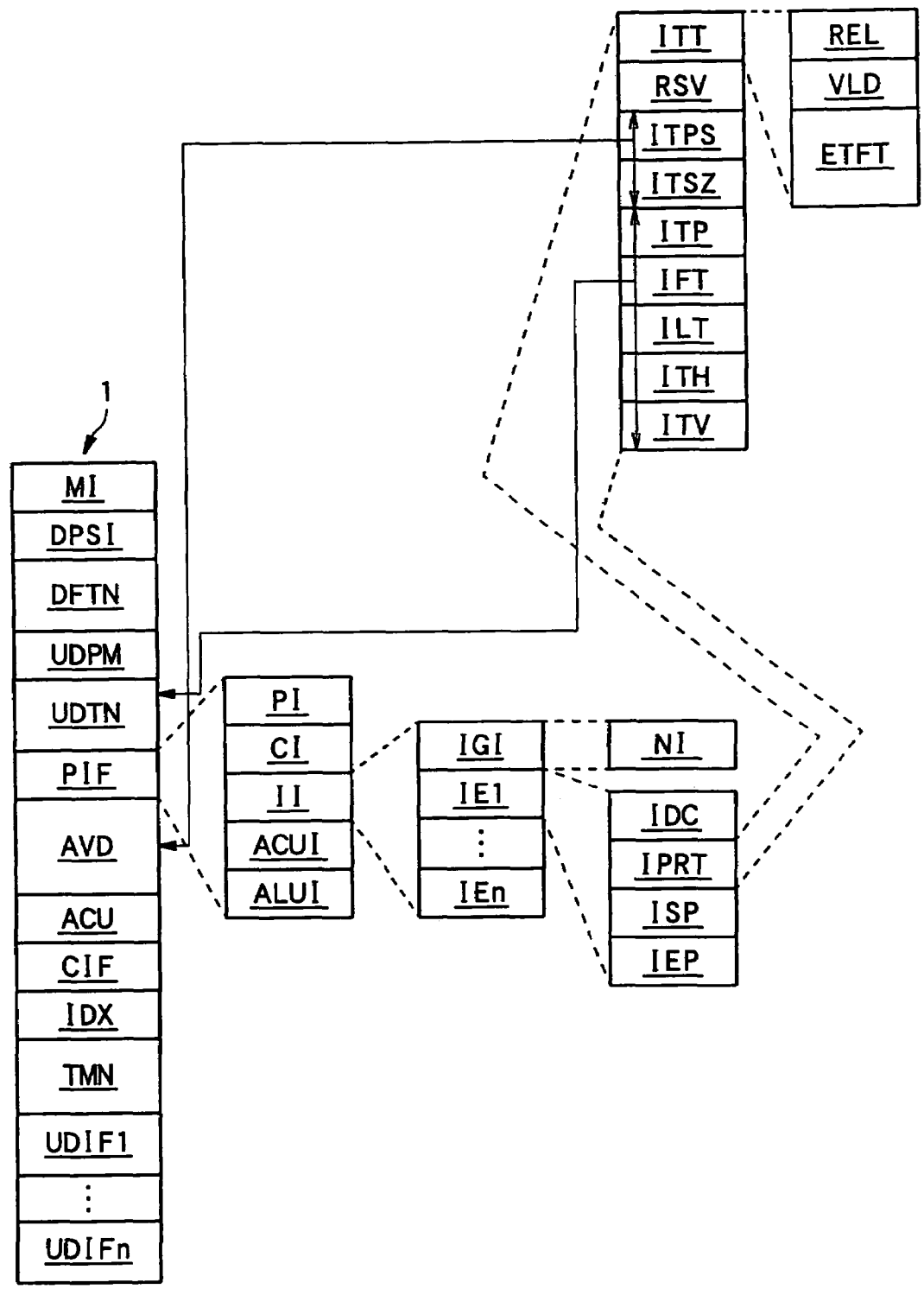
FIG. 5 an explanatory drawing showing a recording format (V) of the present embodiment.
Figure 6:
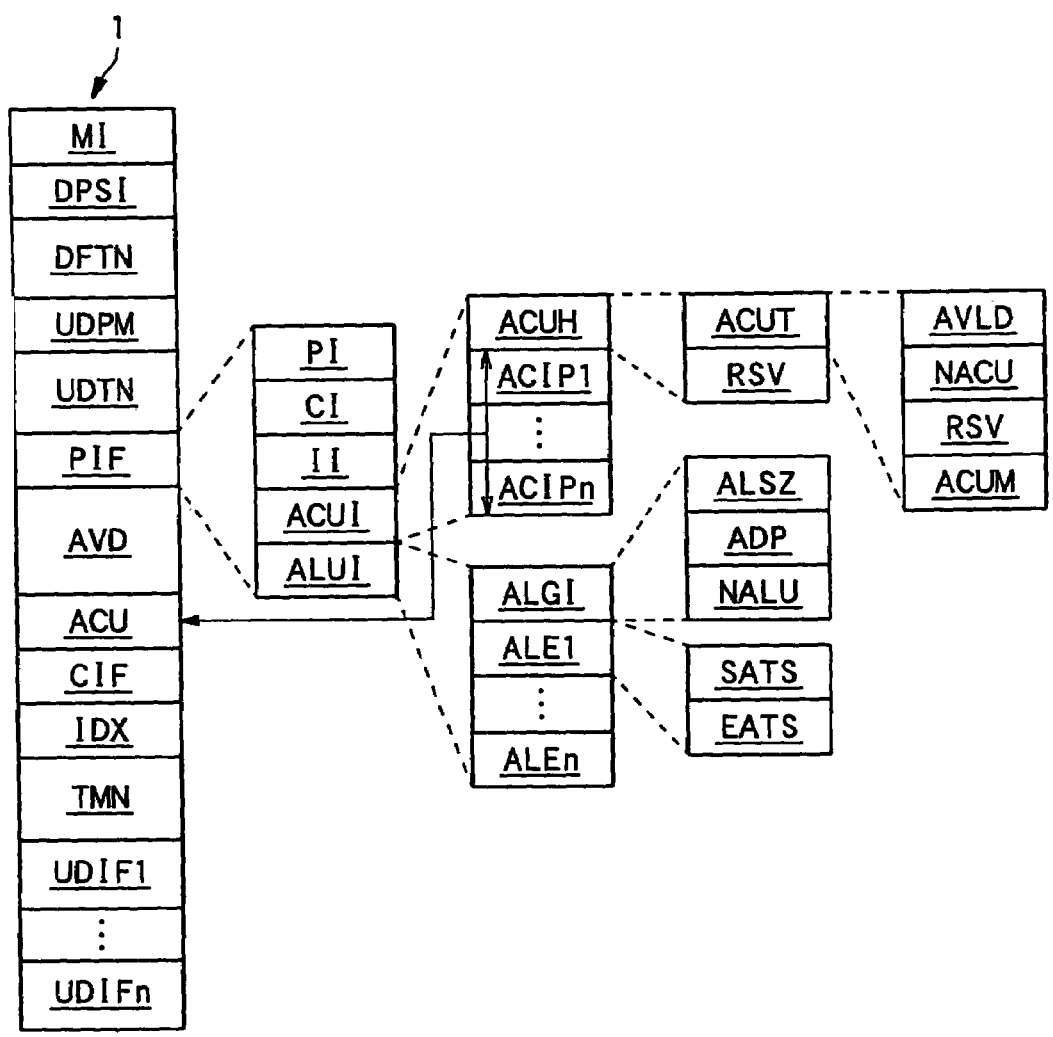
FIG. 6 an explanatory drawing showing a recording format (VI) of the present embodiment.

Referring to FIGS. 4 to 6, the detailed structure of the program information PIF will be described below.

First, as shown in FIG. 4, the program information PIF is constituted of program general information PI describing general information on a corresponding program, program license information CI describing information on a license corresponding to the program, index information II on an index where the program belongs, access unit information ACUI on an access unit included in the program, and allocation unit information ALUI on an allocation unit which includes a predetermined number of packets constituting a transport stream serving as a format during the distribution of the AV information.

The detailed configuration of the program general information PI will be described below.

As shown in FIG. 4, the program general information PI is constituted of program source information PST (1 byte) indicating the source of a program (i.e., whether the program is received via analog broadcasting or BS digital broadcasting and so on), other information PFTC (143 bytes) indicating other information of the program general information PI, program content information PESI (104 bytes) which concerns content information constituting the program (i.e., image, sound, or data which is also generally referred to as an elementary stream), and program recording state information PRS which describes information indicating a recording format when the program is recorded on the hard disk 1.

The program content information PESI is constituted of program content general information PGSI which is general information of the program content information PESI, a plurality of contents information group search pointers CGSP1 to CGSPn describing the recording positions of information on the hard disk 1, the information showing the contents of two or more groups of distributed contents information, the group of contents information being constituted of relevant contents information (e.g., image information and sound information to be simultaneously reproduced) of pieces of contents information constituting the program, pieces of contents information group information CGIF1 to CGIFn which specifically describe information showing the content of the group of contents information, and padding data PD for adjusting an amount of information of the overall program content information PESI.

The program content general information PGSI is constituted of attribute information ATB (1 byte) indicating the attribute of the program and pointer number information SPN (1 byte) indicating the number of contents information group search pointers CGSP included in the program content information PESI.

Further, each of the contents information group search pointers CGSP includes group information start address information CGSA (1 byte) which describes the recording positions of information showing the content of corresponding contents information groups, as address information relative to the recording position of the start of the program content information PESI on the hard disk 1.

Each piece of the contents information group information CGIF is constituted of content information number information NES (1 byte) which describes the number of pieces of contents information included in the contents information group information CGIF.

Each piece of the content information ESI is constituted of auxiliary information RSV (1 byte) which is insignificant information of the content information ESI, content packet identification information CPD which includes type information CTY indicating a type of content information (that is, a type indicating whether content information is image information or sound information) and packet identification information PID for identifying the packet including the content information, and type describing information CMD which specifically describes the identified type.

Referring to FIG. 5, the detailed configuration of the index information II will be described below.

As shown in FIG. 5, the index information II is constituted of index general information IGI which is general information of the index information II and pieces of index entry information IE1 to IEn which describe the start positions of a plurality of indexes on the hard disk 1.

The index general information IGI includes index number information NI (1 byte) which describes information indicating the number of indexes included in the program.

Each piece of index entry information IE is constituted of index description information IDC (100 bytes) including other information of the index, index representative image information IPRT (156 bytes) which concerns image information for a thumbnail image corresponding to the index, index start position information ISP which indicates the start position of a region on which a program included in a program list corresponding to the index is recorded on the hard disk 1, and index end position information IEP which indicates the end position of the region on which the program included in the program list corresponding to the index is recorded on the hard disk 1.

The index representative image information IPRT includes attribute information ITT (1 byte) indicating the attribute of the index representative image, auxiliary information RSV (3 bytes) which is insignificant information of the index representative image information IPRT, index representative image recording position information ITPS (8 bytes) which describes the recording position (the recording position of the start of information serving as the I picture) of image information corresponding to the index representative image on the hard disk 1 (in this case, only the I picture of recorded AV information corresponds to the image information) only when the thumbnail image specifier effective flag (described later) is effective, index representative image information amount information ITSZ (4 bytes) which describes an amount (the number of bytes) of image information corresponding to the index representative image only when the thumbnail image specifier effective flag (described later) is effective, name information ITP (128 bytes) describing the name of image information corresponding to the index representative image, offset position information IFT (4 bytes) describing the position of image information corresponding to the index representative image in the user definition thumbnail image information UDTN (to be specific, the number of offset bytes from the start of the user definition image information UDTN), index representative image information amount information ILT (4 bytes) describing an amount (the number of bytes) of image information corresponding to the index representative image, horizontal information amount information ITH (2 bytes) which describes an amount of information in the horizontal direction of image information corresponding to the index representative image stored as a file, and vertical information amount information ITV (2 bytes) which describes an amount of information in the vertical direction of image information corresponding to the index representative image stored as a file.

To be specific, the index representative image recording position information ITPS and the index representative image information amount information ITSZ indicate the recording position and an amount of information of any one of static images (the static image is used as the index representative image) included in the AV stream information AVD. Meanwhile, the name information ITP, the offset position information IFT, the index representative image information amount information ILT, the horizontal information amount information ITH, and the vertical information amount information ITV indicate static images which are recorded in the user definition thumbnail image information UDTN and are identified by name.

The attribute information ITT includes permission information REL indicating whether the reset of the index representative image should be permitted or not, the thumbnail image specifier effective flag VLD indicating whether the specification of a static image is effective or not, which uses the index representative image recording position information ITPS and the index representative image information amount information ITSZ, and attribute information ETFT indicating the type (attribute) of image information corresponding to an image used as the index representative image when the image is selected from image information other than distributed AV information. In this case, the permission information REL has a value "0" written to it when permitting the reset of the index representative image. When the reset is not permitted, the permission information REL has a value "1" written to it. The thumbnail image specifier effective flag VLD has a value "1" written to it when the specification of a static image is effective, which uses the index representative image recording position information PTPS and the index representative image information amount information ITSZ. When the specification is ineffective, the thumbnail image specifier effective flag VLD has a value "0" written to it.

Referring to FIG. 6, the following will describe the access unit information ACUI and the allocation unit information ALUI.

First, the access unit information ACUI is constituted of an access unit header ACUH serving as header information and name information ACIP1 to ACIPn (each having 128 bytes) describing the names of access unit information included in the access unit reference information ACU.

The access unit header ACUH includes attribute information ACUT describing the attribute of access unit information and auxiliary information RSV (7 bytes) which is insignificant information of the access unit header ACUH.

The attribute information ACUT includes an access unit effective flag AVLD (1 bit) indicating whether recording or reproduction should be performed in each access unit, unit number information NACU (3 bits) which describes information indicating a total number of access units recorded on the hard disk 1, auxiliary information RSV (3 bits) which is insignificant information of the attribute information ACUT, and access unit handling information ACUM (1 bit) which describes information indicating how to handle the access unit. In this case, the access unit effective flag AVLD has a value "0" written to it when only time information on an allocation unit is recorded. When time information on an allocation unit and time information on an access unit are both recorded, the access unit effective flag AVLD has a value "1" written to it. Further, the access unit handling information ACUM has a value "0" written to it when the access unit is handled using display control time information (also referred to as a presentation time stamp) distributed in AV information. The access unit handling information ACUM has a value "1" written to it when the access unit is handled using an arrival (reception) time of a packet distributed with the start of the access unit.

The allocation unit information ALUI is constituted of allocation unit general information ALGI which is general information of allocation unit information and pieces of allocation unit entry information ALE1 to ALEn describing time information on respective allocation units.

The allocation unit general information ALGI is constituted of allocation unit information amount information ALSZ (4 bytes) indicating the number of bytes of information included in one allocation unit, name information ADP (128 bytes) which describes information indicating the name of AV information included in the allocation unit, and unit number information NALU (4 bytes) which describes information indicating a total number of allocation units recorded on the hard disk 1.

Each piece of the allocation unit entry information ALE is constituted of start time stamp information SATS (4 bytes) which describes information indicating a time when the first packet included in the corresponding allocation is received, and end time stamp information EATS (4 bytes) which describes information indicating a time when the last packet included in the corresponding allocation is received.

Figure 7:
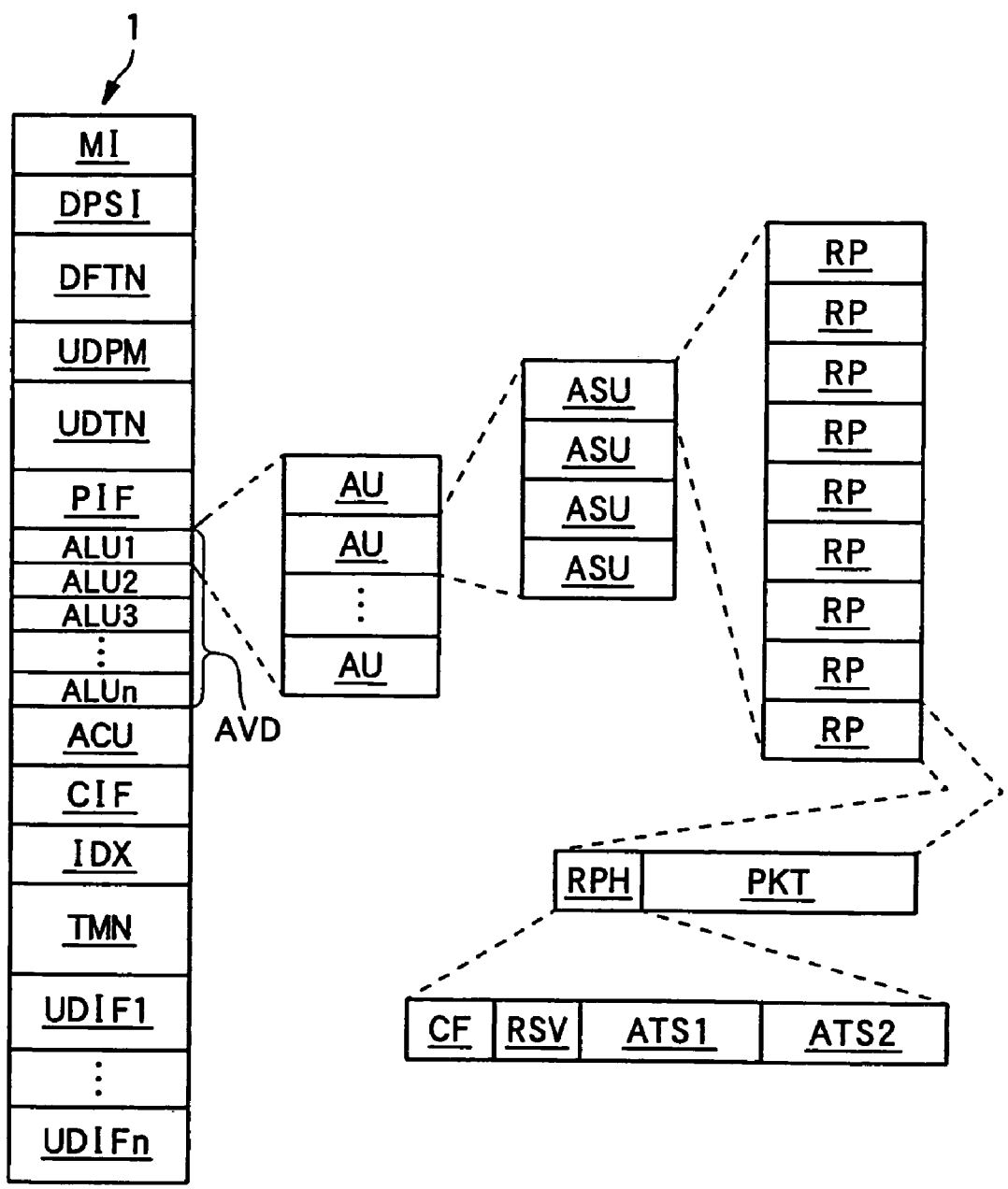
FIG. 7 an explanatory drawing showing a recording format (VII) of the present embodiment.

Referring to FIG. 7, the detailed configuration of the AV stream information AVD will be described below. FIG. 7 shows a recording format obtained by physically analyzing the AV stream information AVD.

First, as shown in FIG. 7, the AV stream information AVD has one or more allocation units ALU recorded on the hard disk 1 in an integrated manner. Each of the allocation units ALU has, for example, information of about 1 megabyte. Further, each of the allocation units ALU is constituted of one or more aligned units AU.

In this case, each of the aligned units AU is constituted of 12 sectors (one sector has 512 bytes), and the aligned unit AU is constituted of four aligned sub units ASU. Each of the aligned sub units ASU is constituted of eight recording packets RP. Each of the recording packets RP is obtained by adding a recording packet header RPH of 4 bytes to the front of a packet (including information of 188 bytes, which is a constant amount) PKT in the transport stream. The recording packet header RPH includes a flag CF (1 bit) which describes information indicating whether AV information distributed in the packet PKT is encrypted or not, auxiliary information RSV (2 bits) which is insignificant information of the recording packet header RPH, reception time information ATS1 indicating the reception time of the packet PKT clocked at 90 kHz, and reception time information ATS2 indicating the reception time of the packet PKT secondarily clocked at 27 MHz.

The above-described logical recording format enables recording and edit of the following embodiment.

(II) EMBODIMENT OF THE INFORMATION RECORDING APPARATUS

The following will describe the configuration and operations of the information recording apparatus which records and edits AV information based on the above-described recording format.

Figure 8:
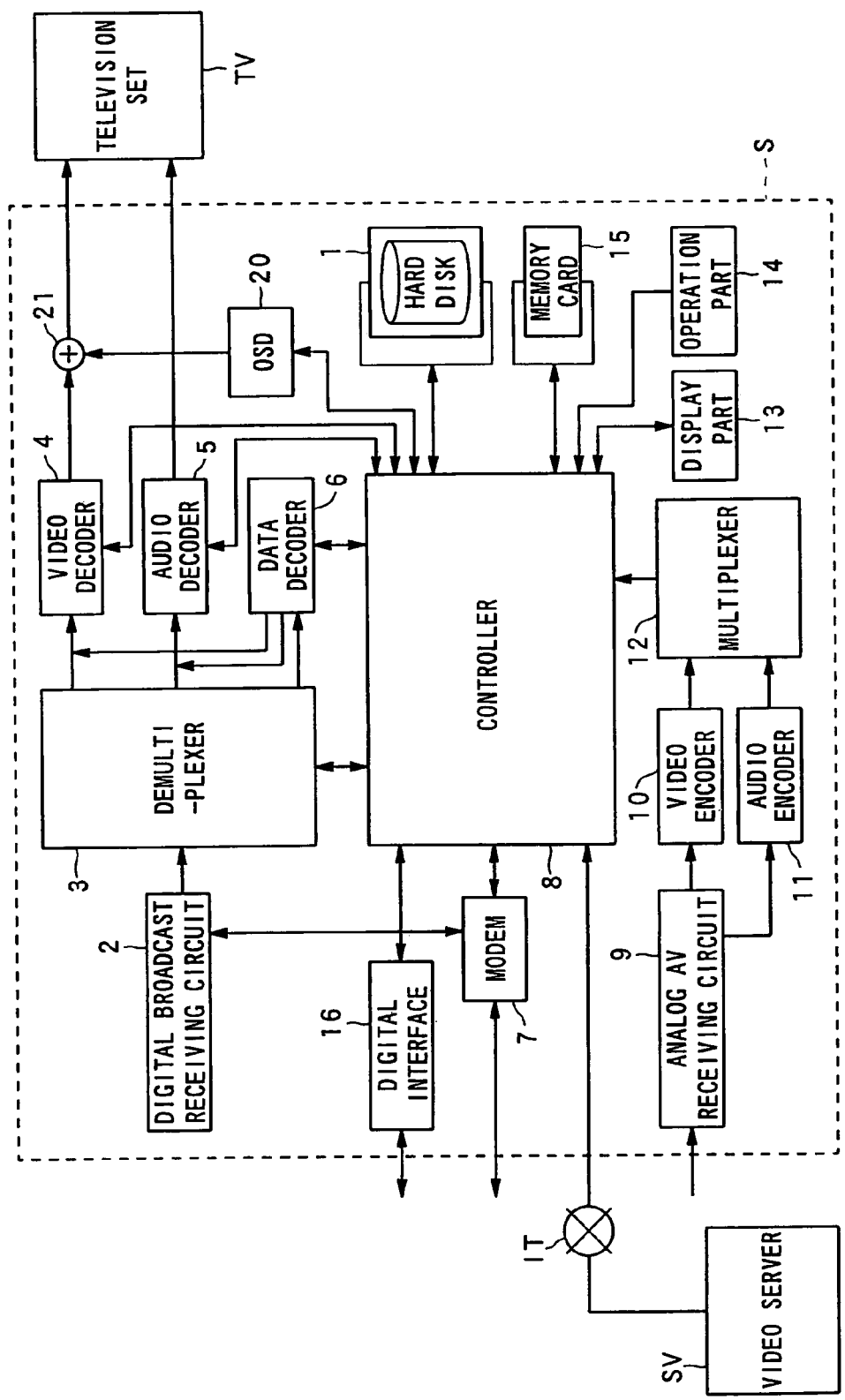
FIG. 8 is a block diagram showing the schematic configuration of an information recording apparatus according to the present embodiment.

Referring to FIG. 8, the following will first describe the overall configuration and the outline of operations of the information recording apparatus.

As shown in FIG. 8, an information recording apparatus S of the present embodiment is directly connected to a television set TV provided outside and is connected to an external video server SV via a network IT such as the Internet.

The information recording apparatus S is constituted of the hard disk 1 serving as a recording medium for recording AV information in the recording format, a digital broadcast receiving circuit 2, a demultiplexer 3, a video decoder 4, an audio decoder 5, a data decoder 6, a modem 7, a controller 8 serving as a deciding device and a changing device, an analog AV receiving circuit 9, a video encoder 10, an audio encoder 11, a multiplexer 12, a display part 13, an operation part 14, a memory card 15 which is a kind of a solid-state recording medium, a digital interface 16, an OSD 20 serving as a generating circuit, and an adding circuit 21.

Figure 9:
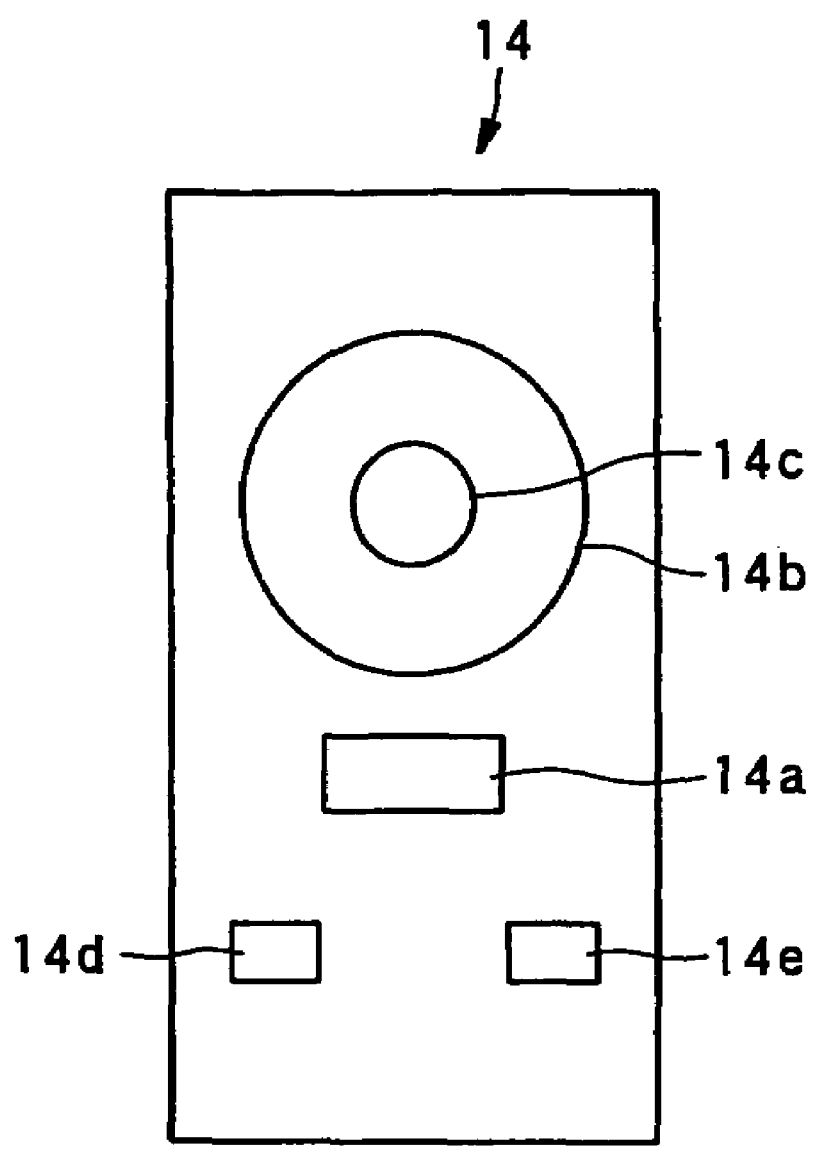
FIG. 9 is an enlarged view showing an operation part of FIG. 8.

For example, a remote control is used as the operation part 14. As shown in FIG. 9, the operation part 14 comprises a play key 14a for reproducing recorded information recorded in the hard disk 1, a multi dial 14b for selecting a thumbnail image, which shows the contents of the recorded information recorded in the hard disk 1, from images corresponding to image information, the multi dial 14b making a rotation to select a thumbnail image from images other than the images corresponding to the image information in the recorded information, an enter key 14c which is pressed when reproducing the thumbnail image selected by rotating the multi dial 14b, a thumbnail-image-included contents list display button 14*d*, and a thumbnail setting start button 14*e*.

The controller 8 decides whether a thumbnail image can be changed or not based on the permission information REL indicating whether a change can be made on the thumbnail image, which shows the contents of the recorded information recorded on the hard disk 1. When the controller 8 decides that a change is not permitted, a change of the thumbnail image is prohibited and a display signal for displaying a warning indicating the prohibition of a change of the thumbnail image is generated by the OSD 20 serving as a generating circuit. The generated display signal is added to the output of the video decoder 4 by the adding circuit 21 as necessary and is displayed on the television set TV. When the controller 8 decides that a change is permitted, the thumbnail image is changed.

The outline of operations will be discussed below.

First, the video server SV generates, according to the format of the transport stream, AV information having been accumulated therein and distributes the AV information to the controller 8 in the information recording apparatus S via the network IT.

Analog terrestrial broadcasting, which is prevalent at present, is received by an analog AV receiving circuit via an antenna (not shown), and image information and sound information are separated from the received broadcasting. The image information is outputted to the video encoder 10 and the sound information is outputted to the audio encoder 11.

Then, the video encoder 10 encodes the image information in a digital manner and outputs the image information to the multiplexer 12.

Simultaneously, the audio encoder 11 encodes the sound information in a digital manner and outputs the sound information to the multiplexer 12.

With these operations, the multiplexer 12 alternately superimposes the digitized image information and sound information and outputs the information to the controller 8.

For example, AV information and so on distributed via a high speed serial network is received by the digital interface 16 and is outputted to the controller 8.

For example, the BS digital broadcasting and so on is received by the antenna (not shown), is decoded by the modem 7 operating under the control of the controller 8, and is outputted to the demultiplexer 3 via the digital broadcast receiving circuit 2.

Subsequently, under the control of the controller 8, the demultiplexer 3 separates image information, sound information, and data information (e.g., program information and the like for a computer corresponds to the data information) from AV information included in the inputted BS digital broadcasting. The image information, the sound information, and the data information are outputted respectively to the video decoder 4, the audio decoder 5, and the data decoder 6 and are separately decoded under the control of the controller 8. At this point, data information generated by decoding in the decoder 6 is superimposed on image information or sound information as necessary before being decoded.

Thereafter, the decoded image information and sound information are outputted for viewing as they are to the external television set TV.

At this point, the controller 8 exercises control over the series of processing operations, instructions and so on required for the control are provided by the user on the operation part 14, and an operation signal corresponding to the instructions is inputted from the operation part 14 to the controller 8, so that the controller 8 recognizes the contents of the instruction and performs necessary processing. Further, regarding an operating state and so on during the control, a display signal is generated by the OSD 20 serving as a generating circuit, the generated display signal is added to the output of the video decoder 4 as necessary by the adding circuit 21, and the result is displayed on the television set TV.

That is, the controller 8 decides whether a thumbnail image can be changed or not based on the permission information REL indicating whether the reset of the initial program set representative image is permitted or not. When the controller 8 decides that the reset of the initial program set representative image is permitted, a value "0" is written. When the reset is not permitted, a value "1" is written. When "0" is written, a change of the thumbnail image is prohibited, the display signal for displaying a warning indicating the prohibition of a change of the thumbnail image is generated by the OSD 20, and the generated display signal is added to the output of the video decoder 4 by the adding circuit 21 as necessary and is displayed on the television set TV. When "0" is written, since a change is permitted, the thumbnail image is changed.

Additionally, AV information to be accumulated in the hard disk 1 is decoded by the video decoder 4 or the audio decoder 5 and so on and is outputted to the controller 8. Then, the controller 8 reconfigures the decoded image information and so on according to the recording format and records the information on the hard disk 1.

Moreover, when AV information recorded on the hard disk 1 is edited, the AV information is read once from the hard disk 1 and is subjected to necessary edits according to operations on the operation part 14.

On the other hand, the memory card 15 accumulates image information to be used as a thumbnail image, and the controller 8 duplicates the thumbnail image to the hard disk 1 and uses the image as the user definition thumbnail image. The thumbnail image may be duplicated to the hard disk 1 via the digital interface 16, a floppy (trademark) drive (not shown), and so on and used as the user definition thumbnail image.

The following will describe the operations of the present embodiment in detail.

Figure 10:
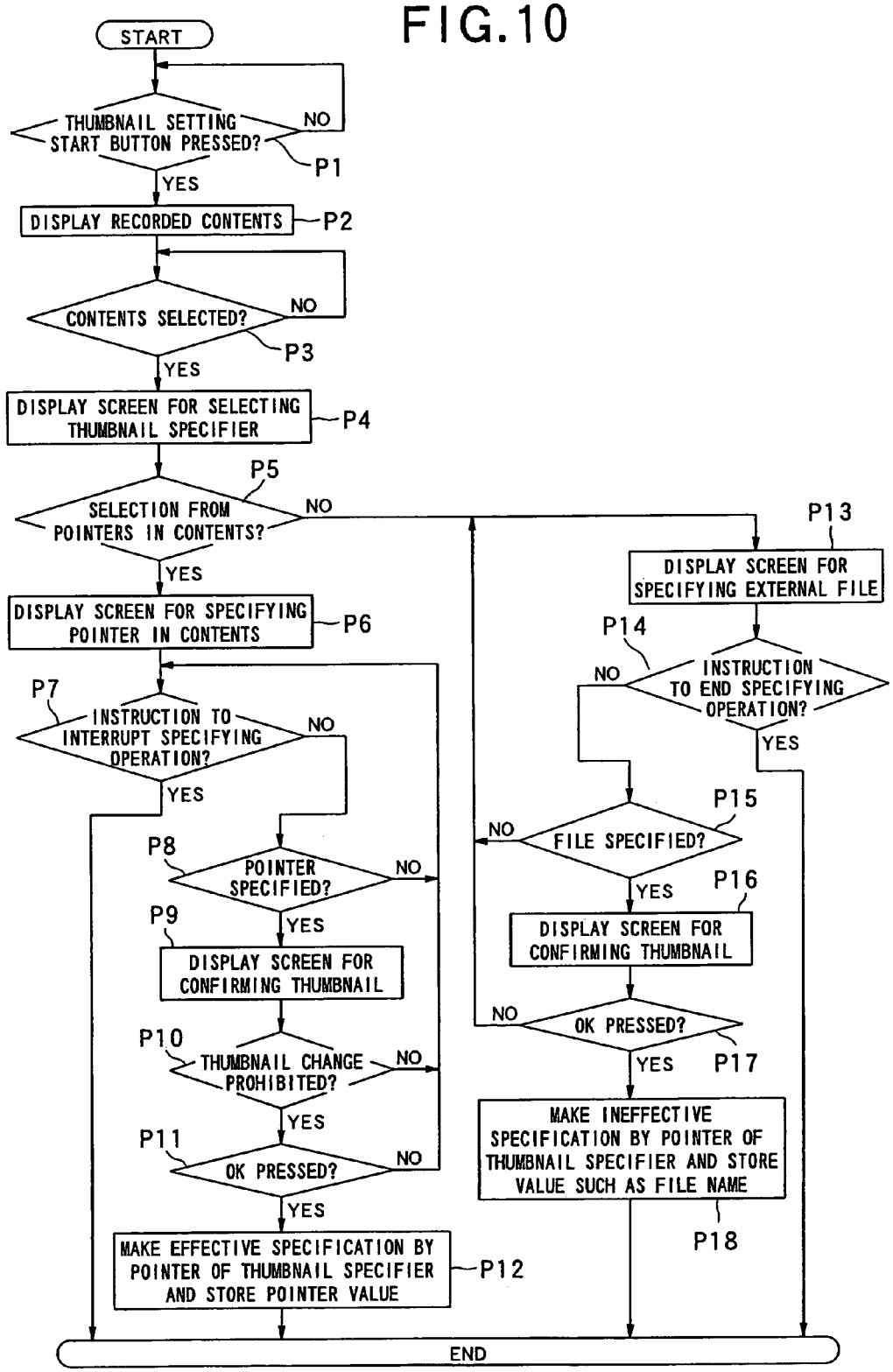
FIG. 10 is a flowchart showing a thumbnail setting made by the user on contents recorded in the present embodiment.

FIG. 10 is a flowchart showing a thumbnail setting made by the user of the recorded contents. The flowchart of FIG. 10 shows that the permission information REL of FIG. 2 indicates permission to reset the initial program set representative image.

As shown in FIG. 10, when the thumbnail setting start button 14*e* is pressed on the operation part 14 of FIG. 9 (step P1; Yes), the process moves to step P2 and recorded contents are displayed on the television set TV as shown in FIG. 11(*a*). Then, when contents are selected from the recorded contents on the screen (step P3; Yes), the process moves to step P4 and a screen for selecting a thumbnail specifier is displayed as shown in FIG. 11(*b*).

Subsequently, when it is decided in step P5 that a selection is made from pointers in the contents, the process moves to step P6 and a screen for specifying a pointer in the contents is displayed as shown in FIG. 11(*c*). When the specifying operation is completed (step P7; Yes), the process is completed. When the specifying operation is not completed (step P7; No), it is decided in step P8 whether a pointer in the contents is specified or not. When a pointer is specified (step P8; Yes), the process moves to step P9 and a screen for confirming a thumbnail image is displayed as shown in FIG. 11(*d*). When a pointer is not specified (step P8; No), the process returns to step P7.

Moreover, it is decided in step P10 whether a change of the thumbnail image should be prohibited or not. When a change is prohibited (step P10; Yes) and "Yes" is pressed on the screen for confirming a thumbnail image shown in FIG. 11(*d*)

(step P11; Yes), the specification of the thumbnail specifier by the pointer is made effective and the value of the pointer is stored (step P12). When a change of the thumbnail image is not prohibited (step P10; No) and "cancel" is pressed on the screen for confirming a thumbnail image (step P11; No), the process returns to step P7.

Figure 11A:
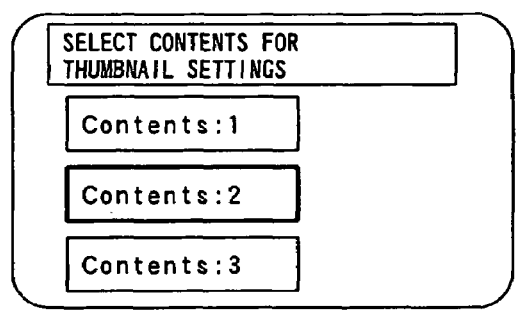
FIGS. 11(*a*) to 11(*e*) are explanatory drawings showing screens displayed on a television set in the flowchart of FIG. 10.
Figure 11B:
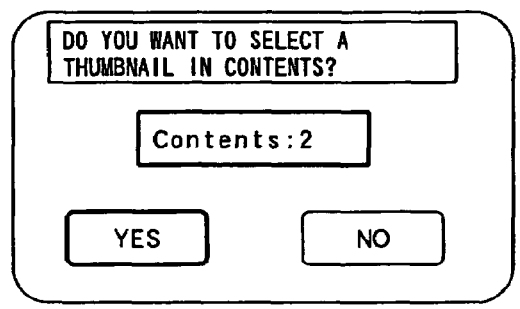
Figure 11C:
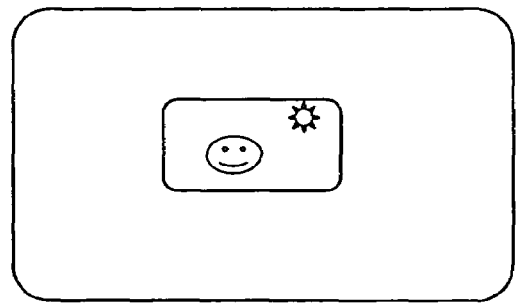
Figure 11D:
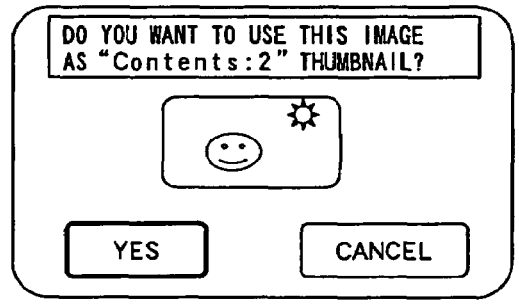
Figure 11E:
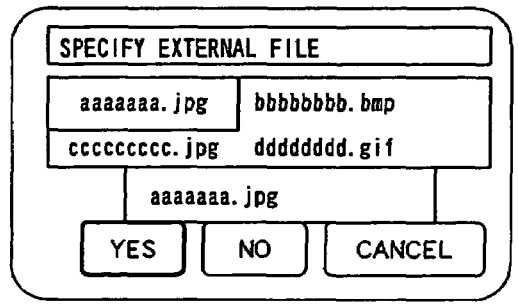

In step P5, when a selection is not made from pointers in the contents, the process moves to step P13 and a screen for specifying an external file is displayed as shown in FIG. 11(e). Then, it is decided in step P14 whether the specifying operation is completed or not. When the specifying operation is not completed and a file is specified (step P15; Yes), the process moves to step P16 and the screen for confirming a thumbnail image is displayed as shown in FIG. 11(d). When the specifying operation is completed in step P14, the processing is completed at this point.

Subsequently, when "Yes" is pressed on the screen for confirming a thumbnail image shown in FIG. 11(d) (step P17; Yes), the specification made by the pointer of the thumbnail specifier is made ineffective and a value such as a file name is stored (step P18). When any file is not specified in step P15 and "cancel" is pressed on the screen for confirming a thumbnail image (step P17; No), the process returns to step P13.

Figure 12:
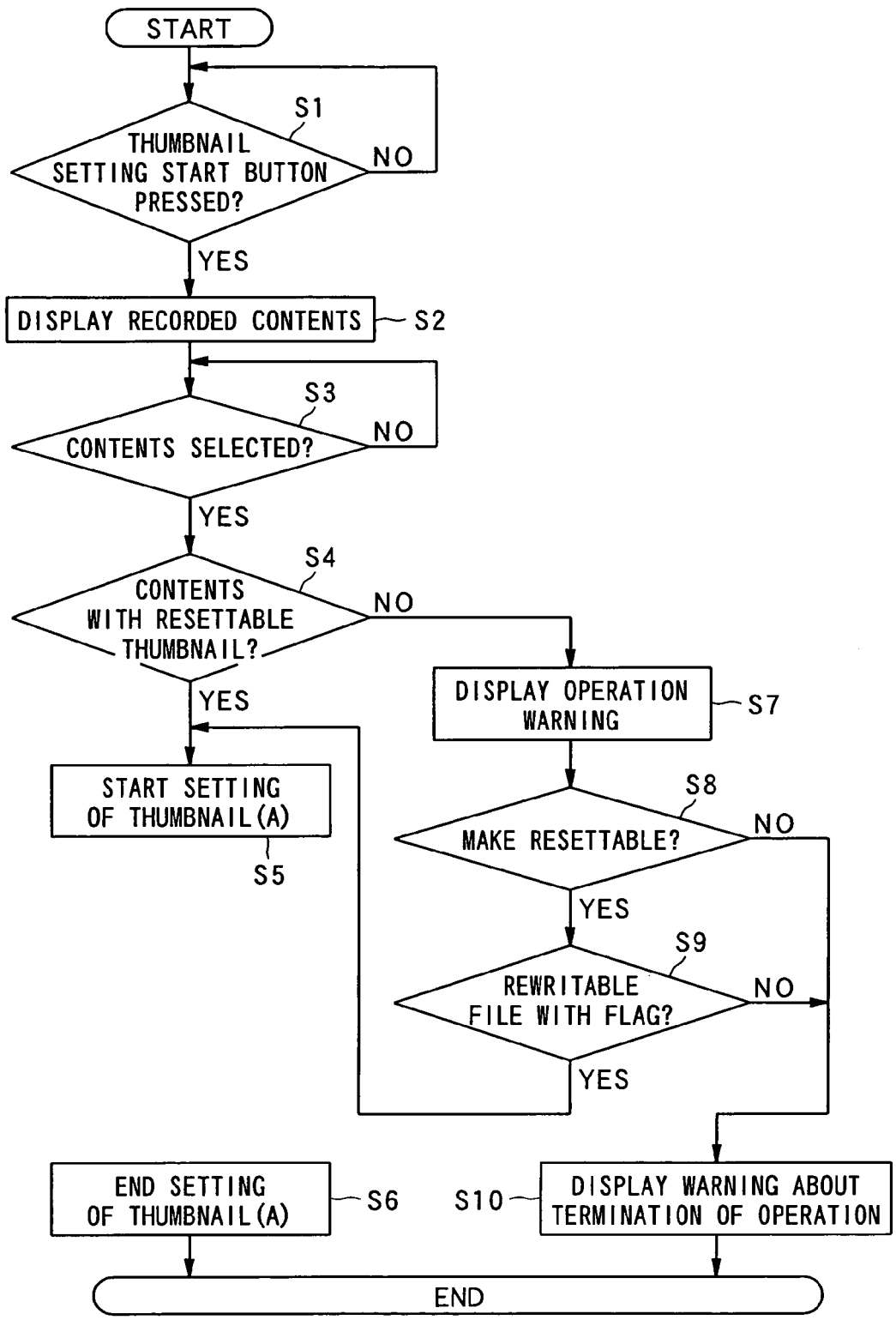
FIG. 12 is a flowchart for deciding whether the reset of a thumbnail image should be permitted or not according to the present embodiment.

Referring to FIG. 12, the following will describe a flowchart for deciding whether the reset of a thumbnail image should be permitted or not according to the present embodiment.

Figure 13A:
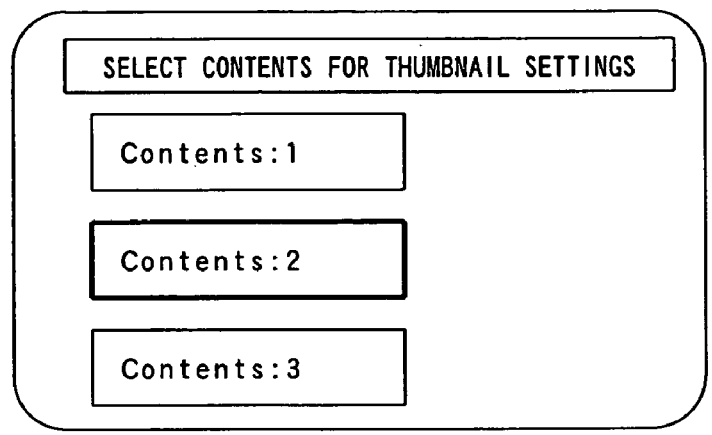
FIGS. 13(*a*) to 13(*c*) are explanatory drawings showing screens displayed on the television set in the flowchart of FIG. 12.

First, when the thumbnail setting start button is pressed in step S1, recorded contents are displayed on the display part 13 of FIG. 8 as shown in FIG. 13(a) (step S2). Then, in step S3, contents for setting a thumbnail are selected by the operation part 14 from the contents displayed on the screen of the television set TV, and it is decided in step S4 whether the contents have a resettable thumbnail. In the case of resettable contents (step S4; Yes), the setting of a thumbnail is started in step S5 according to the flow chart of FIG. 10. When the setting of a thumbnail is completed according to the flowchart of FIG. 10 (step S6), the processing is completed.

Figure 13B:
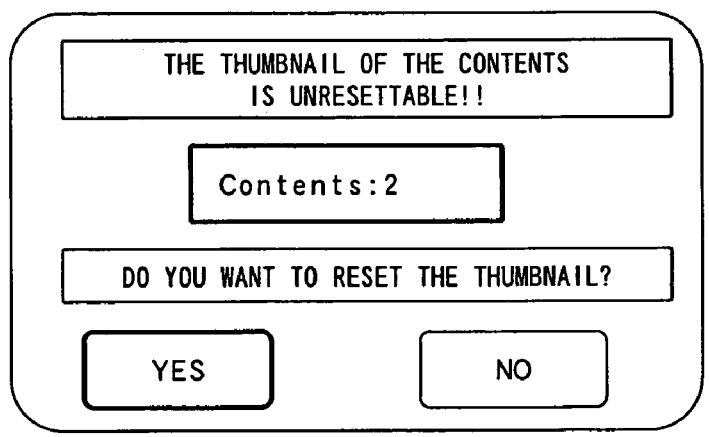

When it is decided in step S4 that the contents have an unresettable thumbnail (step S4; No), the process moves to step S7 and a warning for operation is displayed on the screen of the television set TV as shown in FIG. 13(b). Then, when a thumbnail is made resettable (step S8; Yes), the process moves to step S9 and it is decided whether a file having a flag is rewritable or not. When the file is rewritable (step S9; Yes), the setting of a thumbnail is started in step S5 according to the flowchart of FIG. 10. When the setting of a thumbnail is completed according to the flowchart of FIG. 10 (step S6), the processing is completed.

Figure 13C:
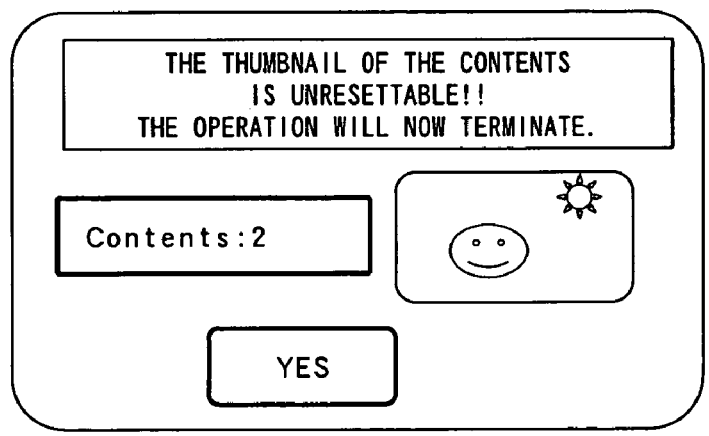

When the thumbnail is not made resettable (step S8; No) and a file having a flag is not rewritable (step S9; No), a warning indicating the termination of the operation is displayed on the screen of the television set TV as shown in FIG. 13(c) (step S10).

Figure 14:
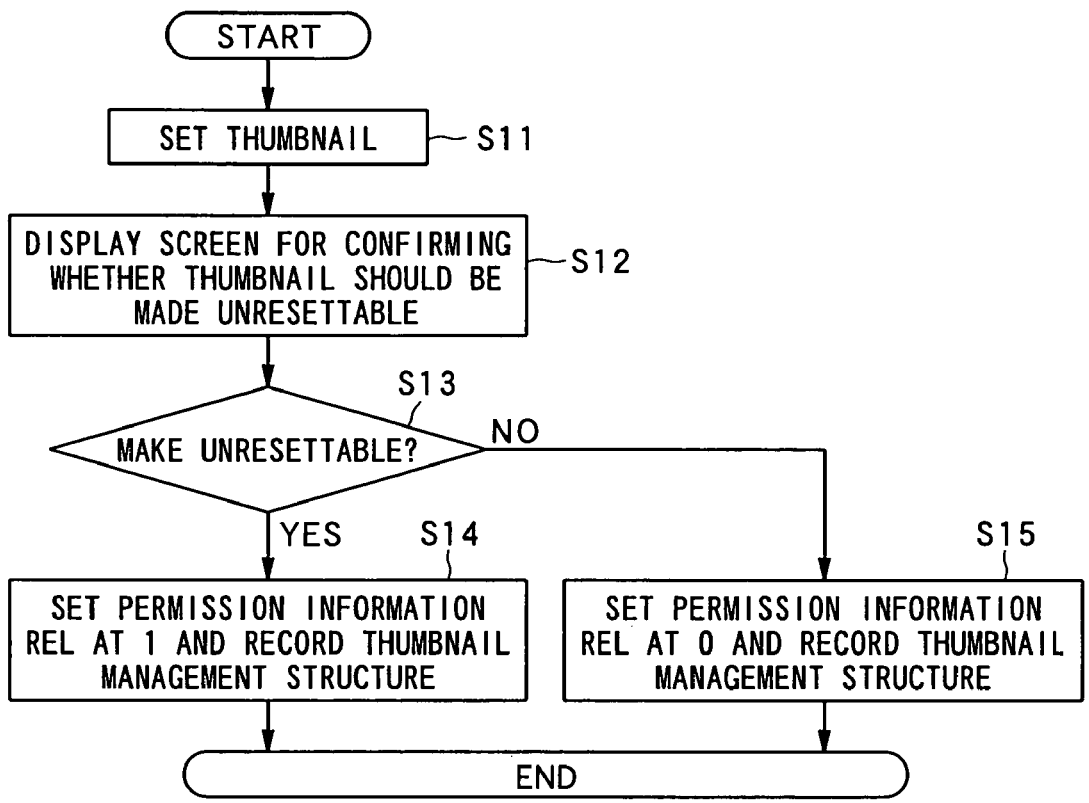
FIG. 14 is a flowchart for setting an unresettable bit of a thumbnail according to the present embodiment.

FIG. 14 is a flowchart showing that an unresettable bit of a thumbnail is set according to the present embodiment.

Figure 15:
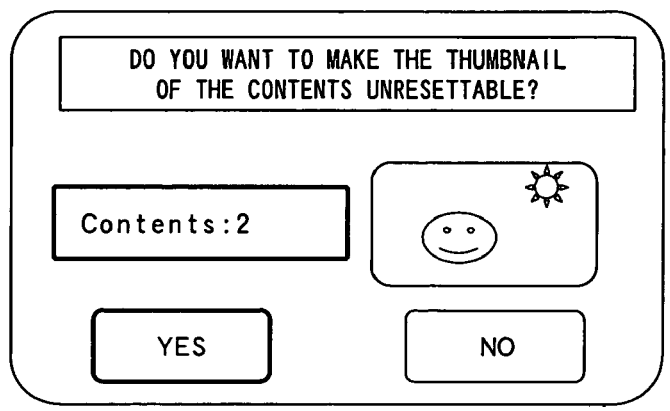
FIG. 15 is an explanatory drawing showing a screen displayed on the television set in the flowchart of FIG. 14.

As shown in FIG. 14, after a thumbnail is set in step S11, a screen for confirming whether the thumbnail should be made unresettable or not is displayed on the television set TV as shown in FIG. 15 (step S12). When it is decided that the thumbnail should be made unresettable (step S13; Yes), the process moves to step S14, the permission information REL is set to "1" and a thumbnail management structure is recorded. When it is decided that the thumbnail should not be made unresettable (step S13; No), that is, when resetting is permitted, the process moves to step S15, the permission information REL is set to "0", and the thumbnail management structure is recorded.

As described above, according to the information recording/reproducing apparatus of the present embodiment, when the controller 8 decides that a change is not permitted based on the change permission information indicating whether a thumbnail image can be changed or not, a change of the thumbnail image is prohibited. Thus, it is possible to prevent an accidental change of the thumbnail image which shows the contents of the recorded information. Consequently, it is possible to protect thumbnail images and recorded information set by a contents holder and protect thumbnail images set by the user.

Further, according to the present embodiment, when the controller 8 decides that a change is not permitted, a warning is displayed to indicate that a thumbnail image cannot be changed. Thus, it is possible to enable the user to clearly recognize that the thumbnail image cannot be changed.

Moreover, according to the present embodiment, when the controller 8 decides that a change is permitted, the thumbnail image is changed. Thus, the user can select whether the thumbnail image should be protected or not, thereby facilitating the setting of the thumbnail image for the user.

The present invention is not limited to the foregoing embodiments and various modifications can be made. For example, in the embodiments, a video signal and so on are obtained by receiving radio waves of ordinary analog terrestrial TV broadcasting or radio waves of digital satellite broadcasting such as BS digital broadcasting. Additionally, for example, a video signal and so on may be obtained from server VOD (video on demand) using the Internet and a private line as a communication channel.

In the embodiments, the hard disk 1 is used as a recording medium. Various recording mediums such as a DVD and a flash memory, which can rewrite information, are also applicable.

Moreover, a program corresponding to the flowcharts of FIGS. 10, 12, and 14 is recorded on an information recording medium including a flexible disk, a hard disk, and the like and the program is read and exercised by a general-purpose microcomputer and so on. Thus, the microcomputer can be caused to act as the controller 8 of the embodiments.

As described above, according to the invention of claim 1, when a deciding device decides that a change is not permitted based on change permission information indicating whether a thumbnail image can be changed or not, a change of the thumbnail image is prohibited. Thus, it is possible to prevent an accidental change of the thumbnail image which shows the contents of recorded information. Consequently, it is possible to protect thumbnail images and recorded information set by a contents holder and protect thumbnail images set by the user.

According to the invention of claim 2, in addition to the effect of the invention of claim 1, when the deciding device decides that a change is not permitted, a warning is displayed to indicate that a thumbnail image cannot be changed. Thus, it is possible to enable the user to clearly recognize that the thumbnail image cannot be changed.

According to the invention of claim 3, in addition to the effect of the invention of claim 1, when the deciding device decides that a change is permitted, a thumbnail image is changed. Thus, the user can select whether a thumbnail image should be protected or not, thereby facilitating the setting of the thumbnail image for the user.

According to the invention of claim 4, when it is decided in a deciding process that a change is not permitted based on the change permission information indicating whether a thumbnail image can be changed or not, a change of the thumbnail image is prohibited. Thus, it is possible to prevent an accidental change of the thumbnail image which shows the contents of recorded information. Consequently, it is possible to protect thumbnail images and recorded information set by a contents holder and protect thumbnail images set by the user.

According to the invention of claim 5, in addition to the effect of the invention of claim 4, when the deciding process decides that a change is not permitted, a warning is displayed to indicate that a thumbnail image cannot be changed. Thus, it is possible to enable the user to clearly recognize that the thumbnail image cannot be changed.

According to the invention of claim 6, in addition to the effect of the invention of claim 4, when the deciding process decides that a change is permitted, a thumbnail image is changed. Thus, the user can select whether a thumbnail image should be protected or not, thereby facilitating the setting of the thumbnail image for the user.

According to the invention of claim 7, when the deciding device decides that a change is not permitted, a computer operates so as to prohibit a change of a thumbnail image. Thus, it is possible to prevent an accidental change of the thumbnail image which shows the contents of the recorded information. Consequently, it is possible to protect thumbnail images and recorded information set by a contents holder and protect thumbnail images set by the user.

According to the invention of claim 8, in addition to the effect of the invention of claim 7, when the deciding device decides that a change is not permitted, the computer operates so as to display a warning indicating that a thumbnail image cannot be changed. Thus, it is possible to enable the user to clearly recognize that the thumbnail image cannot be changed.

According to the invention of claim 9, in addition to the effect of the invention of claim 7, when the deciding device decides that a change is permitted, the computer operates so as to change a thumbnail image. Thus, the user can select whether a thumbnail image should be protected or not, thereby facilitating the setting of the thumbnail image for the user.

According to the invention, in the case where the information editing program of claim 7 is recorded, when the deciding device decides that a change is not permitted, the computer operates so as to prohibit a change of a thumbnail image. Thus, it is possible to prevent an accidental change of the thumbnail image which shows the contents of recorded information. Consequently, it is possible to protect thumbnail images and recorded information set by a contents holder and protect thumbnail images set by the user.

In the case where the information editing program of claim 8 is recorded, when the deciding device decides that a change is not permitted, the computer operates so as to display a warning indicating that a thumbnail image cannot be changed. Thus, it is possible to enable the user to clearly recognize that the thumbnail image cannot be changed.

In the case where the information editing program of claim 9 is recorded, when the deciding device decides that a change is permitted, the computer operates so as to change a thumbnail image. Thus, the user can select whether a thumbnail image should be protected or not, thereby facilitating the setting of the thumbnail image for the user.

The invention claimed is:

1. An information editing apparatus, comprising:
    a deciding device for deciding whether a thumbnail image can be changed or not based on change permission information indicating whether the thumbnail image is changeable, the thumbnail image showing contents of recorded information which includes at least image information and is recorded on a recording medium, and
    a change prohibiting device for prohibiting a change of the thumbnail image when the deciding device decides that a change is not permitted,
    wherein editing is performed on a reproduced form of the recorded information recorded on the recording medium.

2. The information editing apparatus according to claim 1, further comprising a generating circuit which generates a display signal for displaying a warning indicating that the thumbnail image cannot be changed when the deciding device decides that a change is not permitted.

3. The information editing apparatus according to claim 1, further comprising a changing device for changing the thumbnail image when the deciding device decides that a change is permitted.

4. An information editing method, comprising:
    a deciding process for deciding whether a thumbnail image can be changed or not based on change permission information indicating whether a change can be made on the thumbnail image showing contents of recorded information which includes at least image information and is recorded on a recording medium, and
    a change prohibiting process for prohibiting a change of the thumbnail image when the deciding device decides that a change is not permitted,
    wherein editing is performed on a reproduced form of the recorded information recorded on the recording medium.

5. The information editing method according to claim 4, further comprising a generating process which generates a display signal for displaying a warning indicating that the thumbnail image cannot be changed when the deciding device decides that a change is not permitted.

6. The information editing method according to claim 4, further comprising a changing process for changing the thumbnail image when the deciding device decides, instead of the change prohibiting device, that a change is permitted.

7. A computer-readable recording medium encoded with a computer program representing a sequence of instructions, which when executed by a computer included in an information editing apparatus for editing a reproduced form of recorded information which includes at least image information apparatus, the instructions cause the computer to function as:
    a deciding device for deciding whether a thumbnail image can be changed or not based on change permission information indicating whether a change can be made on the thumbnail image showing contents of the recorded information recorded on the recording medium,
    an information editing program for causing the computer serving as the deciding device to act as a change prohibiting device for prohibiting a change of the thumbnail image when the deciding device decides that a change is not permitted.

8. The computer-readable recording medium encoded with the computer program according to claim 7, wherein the computer is caused to act as a generating device which generates a display signal for displaying a warning indicating that the thumbnail image cannot be changed when the deciding device decides that a change is not permitted.

9. The computer-readable recording medium encoded with the computer program according to claim 7, wherein the computer is caused to act as a changing device for changing the thumbnail image when the deciding device decides that a change is permitted.

* * * * *